US010112617B2

United States Patent
Orita

(10) Patent No.: US 10,112,617 B2
(45) Date of Patent: Oct. 30, 2018

(54) DAMPING CONTROL DEVICE FOR ELECTRIC VEHICLE

(71) Applicant: Nissan Motor Co., Ltd., Yokohama-shi, Kanagawa (JP)

(72) Inventor: Shuichi Orita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/554,792

(22) PCT Filed: Mar. 20, 2015

(86) PCT No.: PCT/JP2015/058405
§ 371 (c)(1),
(2) Date: Aug. 31, 2017

(87) PCT Pub. No.: WO2016/151661
PCT Pub. Date: Sep. 29, 2016

(65) Prior Publication Data
US 2018/0237021 A1    Aug. 23, 2018

(51) Int. Cl.
*B60W 30/20* (2006.01)
*B60W 30/19* (2012.01)
(Continued)

(52) U.S. Cl.
CPC .............. *B60W 30/19* (2013.01); *B60L 11/18* (2013.01); *B60L 15/2054* (2013.01);
(Continued)

(58) Field of Classification Search
CPC ..... B60L 11/18; B60L 15/2054; B60W 10/08; B60W 10/10; B60W 20/00; B60W 30/20; B60W 50/0098
(Continued)

(56) References Cited

U.S. PATENT DOCUMENTS

| 7,676,313 B2 * | 3/2010 | Ortmann | B60K 6/365 701/64 |
| 2004/0259680 A1 * | 12/2004 | Ozeki | B60K 6/48 477/3 |

(Continued)

FOREIGN PATENT DOCUMENTS

| CN | 101778731 A | 7/2010 |
| CN | 103016706 A | 4/2013 |

(Continued)

*Primary Examiner* — Thomas G Black
*Assistant Examiner* — Wae L Louie
(74) *Attorney, Agent, or Firm* — Global IP Counselors, LLP

(57) ABSTRACT

A damping control device for an electric vehicle is having a continuously variable transmission between a motor and left and right front wheels. The damping control device drive system includes a feedback control unit, which suppresses a vibration accompanying a disturbance in the rotational speed of the motor, and an operation determination unit, which determines whether or not an absolute value of a second-order differential of the transmission ratio is equal to, or greater than, a predetermined value, wherein when the absolute value of the second-order differential of the transmission ratio is equal to, or greater than, the predetermined value. The feedback control unit performs control of the output torque of the motor whereby a compensation torque component for suppressing a vibration accompanying a gear shift is subtracted from a compensation torque.

10 Claims, 11 Drawing Sheets

(51) Int. Cl.
*B60L 11/18* (2006.01)
*B60W 10/08* (2006.01)
*B60W 20/00* (2016.01)
*B60L 15/20* (2006.01)
*B60W 10/10* (2012.01)
*B60W 50/00* (2006.01)
*F16H 61/662* (2006.01)
*F16H 63/50* (2006.01)

(52) U.S. Cl.
CPC ............ *B60W 10/08* (2013.01); *B60W 10/10* (2013.01); *B60W 20/00* (2013.01); *B60W 30/20* (2013.01); *B60W 50/0098* (2013.01); *B60W 2050/0021* (2013.01); *B60W 2510/1005* (2013.01); *B60W 2510/107* (2013.01); *B60W 2520/10* (2013.01); *B60W 2540/16* (2013.01); *B60W 2710/083* (2013.01); *B60W 2710/1005* (2013.01); *B60Y 2300/19* (2013.01); *F16H 61/662* (2013.01); *F16H 63/502* (2013.01); *Y02T 10/645* (2013.01); *Y02T 10/72* (2013.01); *Y02T 10/7275* (2013.01)

(58) Field of Classification Search
USPC .......................................................... 701/22
See application file for complete search history.

(56) References Cited

U.S. PATENT DOCUMENTS

| | | | |
|---|---|---|---|
| 2013/0080003 A1* | 3/2013 | Ajimoto | F02D 29/02 |
| | | | 701/58 |
| 2017/0113681 A1* | 4/2017 | Kanou | B60W 30/02 |
| 2017/0211691 A1* | 7/2017 | Takahashi | F16H 61/12 |
| 2017/0211697 A1* | 7/2017 | Suwabe | F16H 61/12 |
| 2018/0073454 A1* | 3/2018 | Kono | F02D 11/106 |

FOREIGN PATENT DOCUMENTS

| | | |
|---|---|---|
| JP | 2000-217209 A | 8/2000 |
| JP | 2009-40300 A | 2/2009 |
| JP | 2013-158116 A | 8/2013 |

* cited by examiner

DAMPING CONTROL DEVICE FOR ELECTRIC VEHICLE

CROSS-REFERENCE TO RELATED APPLICATIONS

This application is a U.S. National stage application of International Application No. PCT/JP2015/058405, filed Mar. 20, 2015.

BACKGROUND

Field of the Invention

The present invention relates to a damping control device for an electric vehicle having a motor as a drive source, and a damping control device that suppresses vibration of a drive system from the drive source to the drive wheels.

Background Information

Conventionally, a damping control device for an electric vehicle that combines a feedback control that suppresses vibration by actual disturbances, and a feed forward control that suppresses vibration due to disturbances that are assumed in advance, is known (for example, refer to Patent Document 1—Patent Document 1: Japanese Laid-Open Patent Application No. 2000-217209). According to this prior art, the fluctuation in the motor rotational speed that superimposes disturbance is feedback-corrected to the motor torque to suppress the vibration.

SUMMARY

Meanwhile, an electric vehicle comprising a transmission, provided with an output shaft connected to a motor and a drive shaft connected to the drive wheels, in which the two are connected by a belt, is configured such that the transmission ratio is continuously variable; therefore, there are cases in which vibration occurs, accompanying changes in the transmission ratio. However, in the prior art, while a damping torque suppressing vibration accompanying a gear shift is known, a means to accurately detect changes in the transmission ratio is not provided. Consequently, there are cases in which a change in the transmission ratio is erroneously detected in the prior art, and there is the risk that a damping control does not accurately operate.

In view of the problems described above, an object of the present invention is to provide a damping control device for an electric vehicle that is capable of damping control that corresponds to an accurate determination of the presence or absence of changes in the transmission ratio.

In order to achieve the above-described object, the damping control device for an electric vehicle of the present invention comprises: a shift vibration suppression means that subtracts a compensation torque for suppressing vibration caused by shifting from a compensation torque for suppressing vibration caused by disturbance of a rotational speed of a motor, to control an output torque of the motor. In addition, the damping control device in the present invention is a damping control device for an electric vehicle, in which the shift vibration suppression means carries out a control when the absolute value of a second-order differential of the transmission ratio is equal to or greater than a predetermined value.

In the damping control device for an electric vehicle according to the present invention, it is possible to accurately detect shifting based on a second-order differential of the transmission ratio, to prevent an erroneous detection of shifting. Therefore, according to the present invention, it is possible to prevent an erroneous detection of shifting, to accurately operate the damping control with respect to shifting.

BRIEF DESCRIPTION OF THE DRAWINGS

Referring now to the drawings, a damping control device for hybrid vehicles is illustrated.

DETAILED DESCRIPTION OF THE EMBODIMENTS

Figure 1:
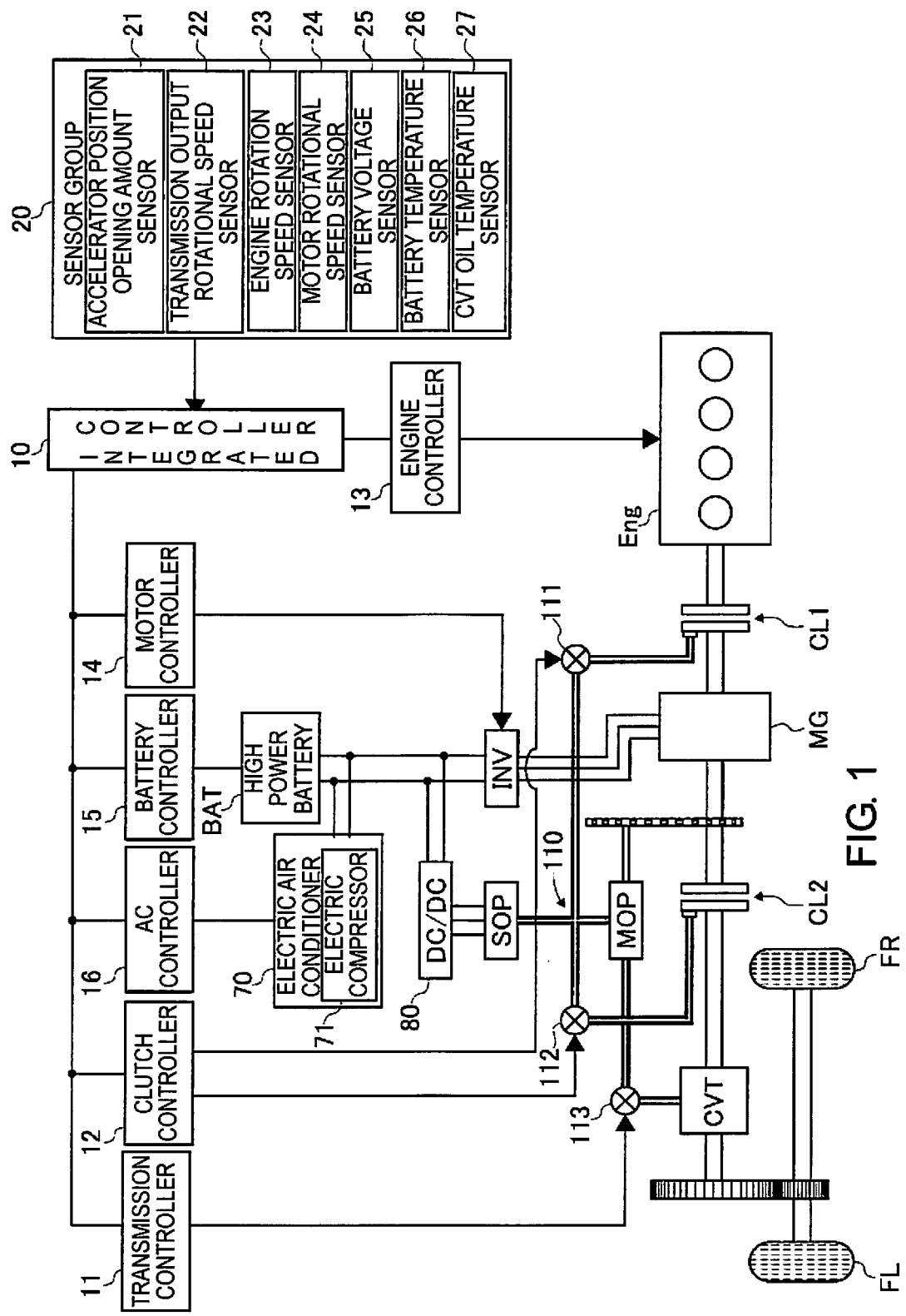
FIG. 1 is an overall schematic diagram illustrating an overall configuration of a hybrid vehicle provided with the damping control device for hybrid vehicles according to a first embodiment.

A preferred illustrative embodiment for realizing the damping control device for an electric vehicle of the present invention is described below based on the illustrative embodiments shown in the drawings.

First Embodiment

First, the configuration of the damping control device for an electric vehicle of the first embodiment will be described. The damping control device for an electric vehicle according to the first embodiment is applied to an FF hybrid vehicle (hereinafter simply referred to as hybrid vehicle), having left and right front wheels as the drive wheels, and a belt-type continuously variable transmission.

The "overall system configuration of a hybrid vehicle", the "control system of the hybrid vehicle", (control configuration by the integrated controller), (configuration of the damping control), (configuration of the operation determination by the operation determination unit), and (details of the configuration of the operation determination unit) will be separately described below, regarding the configuration of the vehicle control device for hybrid vehicles according to the first embodiment.

Overall System Configuration of a Hybrid Vehicle

FIG. 1 is an overall system view of a hybrid vehicle to which is applied the damping control device of the first illustrative embodiment. The overall system configuration of the hybrid vehicle will be described below, based on FIG. 1.

A drive system of a hybrid vehicle includes an engine Eng, a first clutch CL1, a motor-generator MG (hereinafter referred to as motor MG), a second clutch CL2, and a continuously variable transmission CVT.

That is, the drive system of the hybrid vehicle is configured so that it is possible for the outputs of the engine Eng and the motor MG as drive sources to be shifted to a predetermined transmission ratio by the continuously variable transmission CVT, and transmitted to the left and right front wheels FL and FR as the drive wheels.

Additionally, in the drive system of the hybrid vehicle, a first clutch CLI able to connect/disconnect the drive transmission is provided between the engine Eng and the motor MG, and a second clutch CL2 able to connect/disconnect the drive transmission is provided between the motor MG and the continuously variable transmission CVT. It is thereby possible to form an HEV traveling mode in which both clutches CL1 and CL2 are engaged, and traveling is carried out by the drive force of the engine Eng and the motor MG. In addition, it is possible to form an EV mode in which the first clutch CL1 is released and the second clutch CL2 is engaged, and traveling is carried out by the drive force of only the motor MG.

The engine Eng is capable of lean combustion, and the engine torque is controlled to match the command value by controlling the intake air amount by a throttle actuator, the fuel injection amount by an injector, and the ignition timing by a spark plug.

The engine Eng can be started by cranking with the motor MG, while the first clutch CL1 is slip-engaged. In addition, the configuration can be such that it is possible to start by a starter motor, which is not shown, under low-temperature conditions or high-temperature conditions, etc.

The first clutch CL1 is a frictional engagement element that is interposed between the engine Eng and the motor MG. A clutch that is able to switch between full engagement, half engagement, and disengagement by a stroke control based on a first clutch hydraulic pressure supplied from a hydraulic pressure control circuit 110, described later, is used as this first clutch CL1.

The motor MG has an AC synchronous motor structure that serves as a travel drive source, and carries out drive torque control and rotational speed control when starting and traveling, as well as recovering the vehicle kinetic energy generated by the regenerative braking control to the high power battery BAT when braking and decelerating. An inverter INV converts direct current to three-phase alternating current during powering and converts three-phase alternating current to direct current during regeneration, is interposed between the motor MG and the high power battery BAT.

The second clutch CL2 is a frictional engagement element interposed between the motor MG, and left and right front wheels, FL and FR, which are the drive wheels. The second clutch CL2 is also controlled to be in full engagement or slip engagement or disengagement by a stroke control according to a second clutch hydraulic pressure that is supplied from the hydraulic pressure control circuit 110.

The continuously variable transmission CVT is well-known and comprises, although not shown, a primary pulley, a secondary pulley, and a belt wound around both pulleys. Furthermore, the continuously variable transmission CVT is a transmission that achieves a stepless transmission ratio by changing the winding diameters of the pulleys, by a primary pressure and a secondary pressure supplied from the hydraulic pressure control circuit 110 to a primary oil chamber and a secondary oil chamber.

The hydraulic pressure control circuit 110 comprises, as hydraulic power sources, a main oil pump MOP (mechanical drive) and a sub oil pump SOP (motor drive). The main oil pump MOP is rotationally driven by a motor shaft of the motor MG (=transmission input shaft). In addition, the sub oil pump SOP is driven by a built-in motor, and is mainly used as an auxiliary pump for producing lubrication and cooling oil. The sub oil pump SOP is driven by power supplied from a DC/DC converter 80, described later.

The hydraulic pressure control circuit 110 comprises a first clutch solenoid valve 111, a second clutch solenoid valve 112, and a transmission control valve mechanism 113. The first clutch solenoid valve 111 and the second clutch solenoid valve 112 use line pressure PL generated by adjusting the pump discharge pressure from the hydraulic power source as the source pressure, and respectively form a first clutch pressure and a second clutch pressure based on the stroke amount thereof.

The transmission control valve mechanism 113 comprises a solenoid valve operated by a transmission controller 11, and using line pressure PL as the source pressure to create a primary pressure and a secondary pressure according to the stroke amount thereof.

As described above, a hybrid vehicle comprises an "EV mode," an "HEV mode," and an "(HEV) WSC mode" as main driving modes, and a hybrid drive system called one-motor two-clutch is configured therein.

The "EV mode" is an electric vehicle mode having only the motor MG as the drive source by releasing the first clutch CL1 and engaging the second clutch CL2. The "HEV mode" is a hybrid vehicle mode having the engine Eng and the motor MG as drive sources, by engaging both clutches CL1 and CL2. The "WSC mode" is a CL2 slip engagement mode in which the rotational speed of the motor MG is controlled in the "HEV mode," and the second clutch CL2 is slip-engaged with an engagement torque capacity corresponding to a required driving force. The "WSC mode" is selected to absorb the rotational difference between the left and right front wheels FL and FR, and the engine Eng that is rotated at equal to, or greater than, the engine idle rotational speed, in the stopped to the starting regions, or the low-speed to the stopped regions, while in the "HEV mode" by a CL2 slip engagement. The "WSC mode" is necessary because the drive system does not have a rotational difference absorption joint, such as a torque converter.

Control System of the Hybrid Vehicle

The control system of the hybrid vehicle will be described next. The control system of the hybrid vehicle comprises an inverter INV, a high power battery BAT, an integrated controller 10, a transmission controller 11, a clutch controller 12, an engine controller 13, a motor controller 14, a battery controller 15, and an AC controller 16. In the present embodiment, the control system is configured to comprise various controllers individually; however, the control system may be integrated into one controller.

The power supply system of the hybrid vehicle comprises a high power battery BAT as a motor-generator power supply, and a 12V battery (not shown) as a 12V load power supply.

The inverter INV carries out DC/AC conversion, and generates a drive current for the motor MG. The inverter also reverses the output rotation of the motor MG, by reversing the phase of the generated drive current. The high power battery BAT is a secondary battery mounted as a power source for the motor MG, and, for example, a lithium ion battery, in which a cell module configured with numerous cells is set inside a battery pack case, is used therefor. In the present embodiment, the high power battery is not limited to a lithium ion battery, and may be a power storage means such as a nickel hydrogen battery.

The inverter INV converts DC power from the high power battery BAT to a three-phase alternating current and supplies the same to the motor MG, at the time of powering, in which the motor MG is driven by the discharge of the high power battery BAT, by a powering/regeneration control by the motor controller 14. In addition, the inverter converts the three-phase AC power from the motor MG to DC power at the time of regeneration for charging the high power battery BAT, by the power generation by the motor MG.

The integrated controller 10 is configured from an electronic control unit (ECU) provided with a microcomputer, and calculates a target drive torque, and the like, from the remaining battery capacity (battery SOC); the accelerator position opening amount APO; the vehicle speed VSP, and the like. Then, based on the calculation result, the integrated controller 10 calculates command values for each of the actuators (motor MG, engine Eng, first clutch CL1, second clutch CL2, and the continuously variable transmission CVT), which are transmitted to the respective controllers 11-15.

The battery SOC is input from the battery controller 15. The accelerator position opening amount APO is detected by an accelerator position opening amount sensor 21. The vehicle speed VSP is a value that is synchronized with the transmission output rotational speed, and is detected by a transmission output rotational speed sensor 22. In addition, the integrated controller 10 controls the discharge flow rate of the main oil pump MOP, the discharge flow rate of the sub oil pump SOP, and the line pressure PL.

The transmission controller 11 performs a shift control so as to achieve a gear shift command from the integrated controller 10. The shift control is carried out by controlling the hydraulic pressure supplied to the primary pulley and the hydraulic pressure supplied to the secondary pulley of the continuously variable transmission CVT, based on the control of the transmission control valve mechanism 113, using the line pressure PL supplied via the hydraulic pressure control circuit 110 as the source pressure. Then, the surplus pressure generated when creating the hydraulic pressure supplied to the primary pulley and the hydraulic pressure supplied to the secondary pulley from the line pressure PL, is passed onto cooling and lubricating the first clutch CL1 and the second clutch CL2.

Furthermore, the transmission controller 11 executes a transmission control by a "continuously variable transmission mode" and a transmission control by a "pseudo stepped transmission mode", as a transmission control of the continuously variable transmission CVT. The transmission control in the "continuously variable transmission mode" is a control to change the transmission ratio in a stepless manner, in a transmission ratio range from a lowest transmission ratio to the highest transmission ratio that are possible with the continuously variable transmission CVT.

On the other hand, the transmission control in the "pseudo stepped transmission mode" is a transmission control that simulates a stepped transmission for changing the transmission ratio of the continuously variable transmission CVT in a stepwise manner. Furthermore, a "D-step shifting mode" and a "manual shifting mode" are provided as the "pseudo stepped transmission mode". The "D-step shifting mode" is a mode to automatically upshift from pseudo 1st speed to pseudo 6th speed in a stepwise manner, in accordance with the accelerator position opening amount APO and the vehicle speed VSP, during acceleration traveling such that the vehicle speed is increased in a high accelerator position opening amount range.

The "manual shifting mode" is a mode for manually controlling the transmission ratio by a shifting operation by the driver. For example, in this mode, if the driver selects the manual shifting mode and the driver carries out an upshift operation or a downshift operation in this state, the gear shift stage (fixed transmission ratio) is changed, and the transmission ratio is controlled to a transmission ratio that corresponds to the selected gear shift stage.

As described above, since the transmission ratio changes in a stepwise manner when shifting according to the "D-step shifting mode" and the "manual shifting mode" in the "pseudo stepped transmission mode", the transmission ratio change becomes relatively large, compared to shifting in a continuously variable shifting mode.

The clutch controller 12 receives input and output rotational speeds, the clutch oil temperature, etc., of the clutch, and carries out a first clutch control and a second clutch control, so as to achieve a first clutch control command and a second clutch control command from the integrated controller 10.

This first clutch control is carried out by controlling the hydraulic pressure supplied to the first clutch CL1 based on the control of the first clutch solenoid valve 111, using the line pressure PL supplied via the hydraulic pressure control circuit 110 as the source pressure.

In addition, the second clutch control is carried out by controlling the hydraulic pressure supplied to the second clutch CL2 based on the control of the second clutch solenoid valve 112, using the line pressure PL supplied via the hydraulic pressure control circuit 110 as the source pressure.

Then, the surplus pressure, which is generated when creating the hydraulic pressure supplied to the first clutch CL1 and the hydraulic pressure supplied to the second clutch CL2 from the line pressure PL, is passed onto cooling and lubricating the first clutch CL1 and the second clutch CL2.

The engine controller 13 inputs the engine rotational speed detected by the engine rotation speed sensor 23, target engine torque commands from the integrated controller 10, and the like. Then, the engine controller 13 carries out start control, fuel injection control, ignition control, fuel cut control, and the like, in order to control the engine torque so as to achieve the target engine torque command value.

The motor controller 14 inputs target motor torque command values and motor rotational speed command values from the integrated controller 10, the motor rotational speed detected by the motor rotational speed sensor 24, and the like Then, the motor controller 14 carries out controls such as the powering control and the regenerative control, motor creep control, and motor idle control of the motor MG, so as to achieve the target motor torque command value and the motor rotational speed command value.

The battery controller 15 manages the battery temperature, the battery SOC, which is the remaining capacity of the high power battery BAT, and the like, based on the input information from a battery voltage sensor 25, a battery temperature sensor 26, and the like, and transmits the information to the integrated controller 10.

The AC controller 16 controls the operation of an electric air conditioner 70, based on the detection of a sensor (not shown) that detects various environmental factors relating to the cabin temperature. The electric air conditioner 70 is operated by a power supply from the high power battery BAT to adjust the temperature inside the vehicle, and an electric compressor 71 that compresses a refrigerant is provided in the electric air conditioner 70. The electric compressor 71 incorporates an inverter (not shown), converts DC power supplied from the high power battery BAT to AC power, and is driven by a motor (not shown). A DC/DC converter 80 is connected to the high power battery BAT in parallel with the electric air conditioner 70. The DC/DC converter 80 supplies DC power to on-board electric devices, such as the sub oil pump SOP, after transforming the voltage of the high power battery BAT.

Control Configuration of the Integrated Controller

Figure 2:
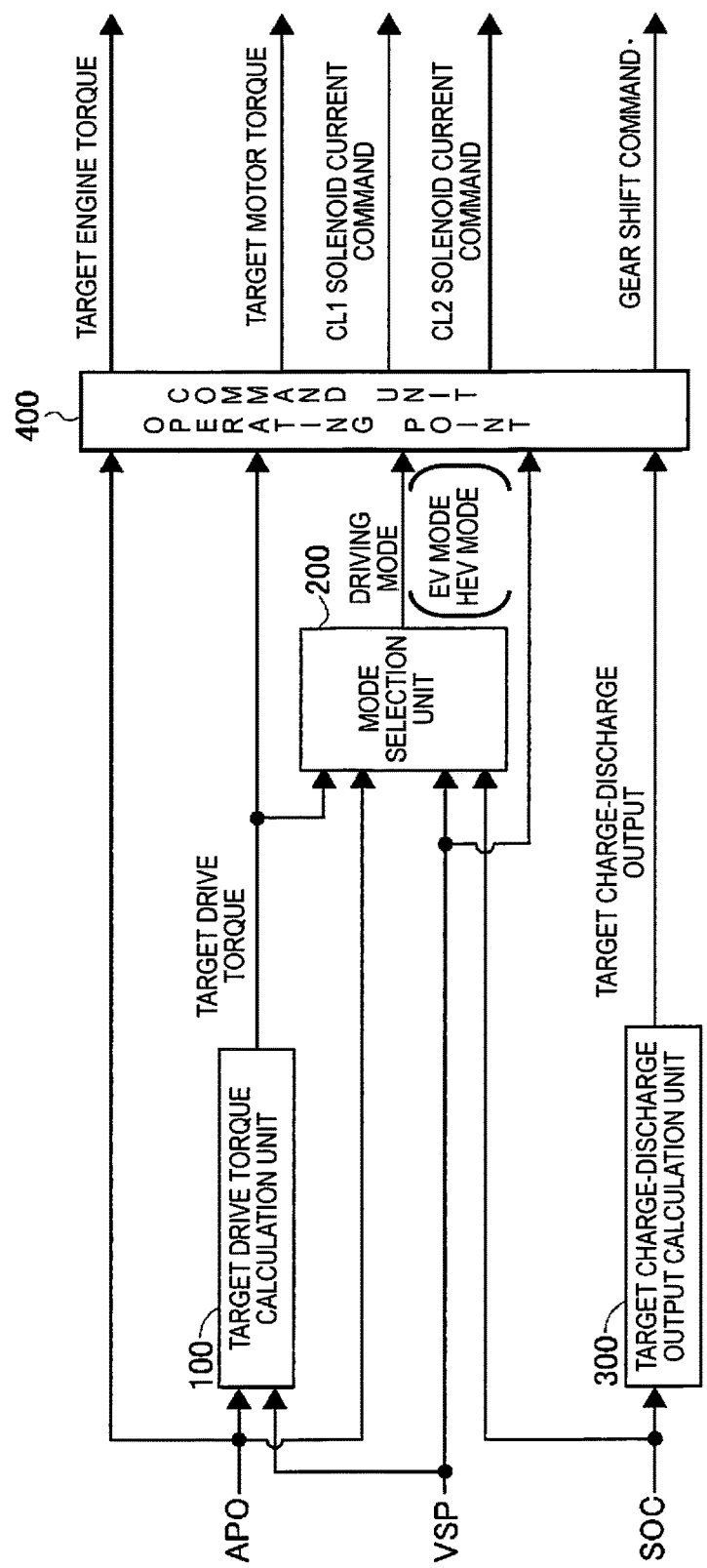
FIG. 2 is a block diagram illustrating a configuration of an integrated controller of the damping control device for an electric vehicle according to the first embodiment.

Next the overall configuration for carrying out the controls of the integrated controller 10 will be briefly described. The integrated controller 10 comprises a target drive torque calculation unit 100, a mode selection unit 200, a target charge/discharge output calculation unit 300, and an operating point command unit 400, as illustrated in FIG. 2.

In the target drive torque calculation unit 100, the accelerator position opening amount APO, the vehicle speed, etc., are input, and a target drive torque tTd (target vehicle total torque) is calculated from a target stationary torque map (one example of an engine torque map), and an assist torque map (one example of a motor-generator torque map).

The mode selection unit 200 calculates which driving mode to be the target driving mode, that is, the HEV mode or the EV mode. The setting of the driving mode by the mode selection unit 200 can be, for example, selecting between the EV mode and the HEV mode according to the vehicle speed and the accelerator position opening amount based on a mode selection map that is set in advance; however, the details are omitted.

The target charge/discharge output calculation unit 300 increases the power generation amount when the battery SOC is low, reduces the power generation amount when the battery SOC is high, and calculates the target charge/discharge power so as to increase the motor assistance.

The operating point command unit 400 calculates the operating point arrival targets from the accelerator position opening amount APO, the target driving torque tTd, the driving mode, the vehicle speed VSP, and the target charge/discharge power, which are output as command values. A target engine torque, a target motor torque, a target CL2 torque capacity, a target transmission ratio, a first clutch solenoid current command, and a second clutch solenoid current command, are calculated as these operating point arrival targets. In the present embodiment, the operating point command unit 400 integrally calculates the target engine torque, the target motor torque, the target CL2 torque capacity, the target transmission ratio, the first clutch solenoid current command, and the second clutch solenoid current command; however, a means to calculate the command values can be provided for each.

Configuration of the Damping Control

Figure 3:
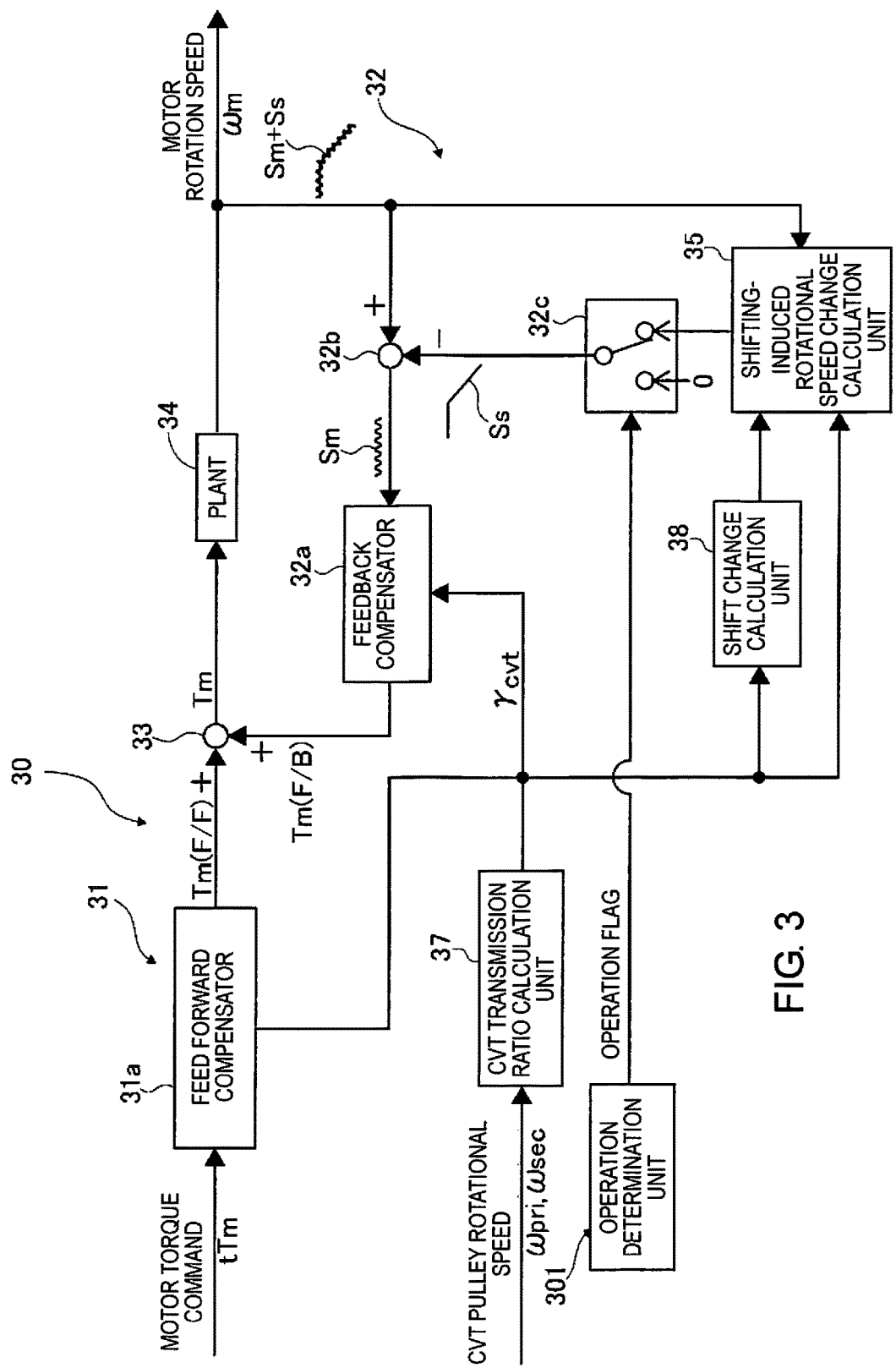
FIG. 3 is a block diagram illustrating a motor torque calculation unit in the damping control device for an electric vehicle according to the first embodiment.

The integrated controller 10 comprises a motor torque calculation unit 30, illustrated in FIG. 3, which corrects a motor torque command applied to the motor MG (target motor torque (tTm)) so as to suppress the vehicle vibration, and outputs the same as the final target motor torque, as a configuration that carries out a damping control. The motor torque calculation unit 30 comprises a feed forward control unit 31 and a feedback control unit 32.

The feed forward control unit 31 attenuates vibrations caused by a disturbance that is assumed in advance, and comprises a feed forward compensator 31a that attenuates the target motor torque tTm (motor torque command) by an inverse filter (not shown), and outputs the same to an adder 33.

The feedback control unit 32 attenuates a predetermined vibration caused by an actual disturbance, and comprises a feedback compensator 32a that outputs a compensation torque Tm (F/B) that suppresses a predetermined vibration component of the motor rotational speed ωm output from a plant 34 (drive system of a vehicle).

In addition, the feedback control unit 32 comprises a subtraction unit 32b that subtracts a rotational speed change component (Ss) of the vibration caused by shifting, described later, from a vibration characteristic component (Sm+Ss) by a disturbance of the motor rotational speed ωm that is input by the feedback compensator 32a.

The feedback control unit 32 comprises a switching unit 32c that switches the operation state of the subtraction unit 32b between a subtraction operation (set) in which the rotational speed change component (Ss) is subtracted, and a subtraction non-operation (clear), in which the subtraction value is set to zero, and the rotational speed change component (Ss) is not subtracted.

That is, the subtraction operation of the subtraction unit 32b is not always executed, but is executed when an operation command is output from the operation determination unit 301 to the switching unit 32c. While the output and stopping of the output of the operation command will be described later, essentially, the presence or absence of shifting with a large transmission ratio/acceleration is determined, and an operation command for a correction operation is output when shifting is determined to be present.

A shifting-induced rotational speed change calculation unit 35 calculates the rotational speed change component Ss by the shifting of the disturbance included in the motor rotational speed ωm, based on changes in an actual transmission ratio RT, which is input from a CVT transmission ratio calculation unit 37, and the shift change calculated by a shift change calculation unit 38.

Therefore, the feedback compensator 32a inputs a vibration component (Sm+Ss) by a disturbance included in the motor rotational speed com and outputs a compensation torque Tm (F/B) for suppressing the vibration, at the time of a non-subtraction operation of the subtraction unit 32b. On the other hand, the feedback compensator 32a inputs a vibration component Sm obtained by subtracting the rotational speed change component Ss due to shifting, at the time of a subtraction operation of the subtraction unit 32b. At this time, the compensation torque Tm (F/B) calculated by the feedback compensator 32a is a value obtained by subtracting the amount of compensation torque for suppressing the vibration by the rotational speed change component Ss due to shifting.

The CVT transmission ratio calculation unit 37 calculates the transmission ratio from a primary rotational speed ωpri, which is the rotational speed of a primary pulley (not shown) of the continuously variable transmission CVT, and a secondary rotational speed ωsec, which is the rotational speed of a secondary pulley (not shown). While these rotational speeds may be directly detected by providing a sensor, the rotational speeds may also be obtained from the motor rotational speed that is detected by a motor rotational speed sensor 24, and the transmission output rotational speed that is detected by a transmission output rotational speed sensor 22.

Configuration of the Operation Determination Unit

Figure 4:
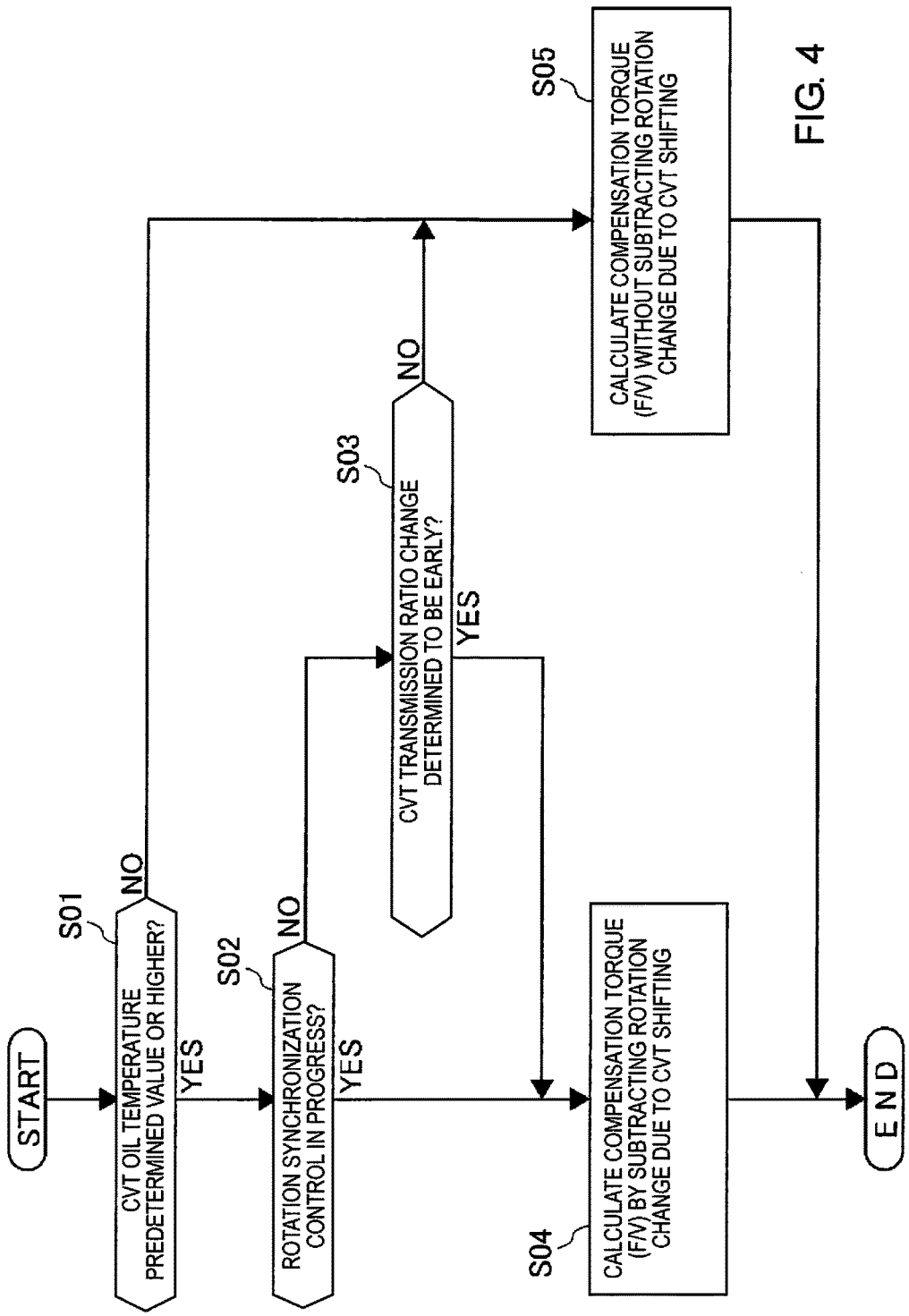
FIG. 4 is a flowchart illustrating the flow of a vibration suppression process of the damping control device for an electric vehicle according to the first embodiment.

Next, the operation determination unit 301 that outputs an operation command to the subtraction unit 32b will be described. First, the flow of the operation determination of the operation determination unit 301 and the vibration suppression process of the feedback control unit 32 corresponding thereto, will be described based on the flowchart of FIG. 4. In Step S01, it is determined whether or not the oil temperature (CVT oil temperature) of the continuously variable transmission CVT, which is detected by a CVT oil temperature sensor 27, is a predetermined value or higher; if equal to or greater than the predetermined value, the process proceeds to Step S02, and if less than the predetermined value, the process proceeds to Step S05. The predetermined value determines whether or not it is after warm-up in which the oil viscosity of the continuously variable transmission CVT has decreased to some extent, that is, a state in which a desired responsiveness can be obtained in the transmission ratio control of the continuously variable transmission CVT. That is, when the CVT oil temperature is low, the responsiveness of the actual transmission ratio relative to the command value of the target transmission ratio to the continuously variable transmission CVT cannot be sufficiently obtained, and it is difficult to obtain the desired damping performance by the damping control that is described later. Therefore, the predetermined value is set to a value with which it is possible to determine whether or not the desired responsiveness described above can be obtained.

In Step S02, to which the process proceeds when the CVT oil temperature is equal to or greater than the predetermined value, it is determined whether or not the continuously variable transmission CVT is undergoing a rotation synchronization control; if rotation synchronization is in progress, the process proceeds to Step S04, and if a rotation synchronization control is not in progress, the process proceeds to Step S03. Whether or not a rotation synchronization control is in progress is determined by determining that a rotation synchronization control is in progress when a rotation synchronization flag is set, which indicates an execution of shifting by the "D-step shifting mode" and the "manual shifting mode" in the "pseudo stepped transmission mode", based on the command of the transmission controller 11.

In Step S03, to which the process proceeds when rotation synchronization is not in progress, if it is determined whether or not it has been determined that the transmission ratio change of the continuously variable transmission CVT is early; if determined to be early, the process proceeds to Step S04, and if determined to be not early, the process proceeds to Step S05. The determination as to whether or not the transmission ratio change is early is determined from whether or not the second-order differential (transmission ratio/acceleration) of the target transmission ratio (command value) is greater than a preset threshold value, in a large transmission ratio/acceleration determination section 341, described later.

In Step S04, to which the process proceeds when it is determined that rotation synchronization control is in progress in Step S02, and it is determined that the transmission ratio change is early in Step S03, the rotation change due to shifting is subtracted to calculate the compensation torque Tm (F/B).

That is, the switching unit 32c of FIG. 3 is turned ON, and the rotational speed change component (Ss) due to shifting is subtracted from the vibration component (Sm+Ss) of the motor rotational speed in the subtraction unit 32b. Therefore, the feedback compensator 32a subtracts the amount of compensation torque for suppressing the rotation change (vibration) due to shifting, to calculate the compensation torque Tm (F/B).

On the other hand, in Step S05, to which the process proceeds if the CVT oil temperature is less than the predetermined value (NO in Step S01), or if a rotation synchronization control is not in progress and the CVT shift change is not early (NO in Step S03), the compensation torque Tm (F/B) is calculated without subtracting the rotation change due to shifting.

That is, the switching unit 32c of FIG. 3 is turned OFF, and the vibration component (Sm+Ss) of the motor rotational speed cum is input to the feedback compensator 32a without subtracting the rotational speed change component (Ss) due to shifting in the subtraction unit 32b. Therefore, the feedback compensator 32a calculates a compensation torque Tm (F/B) for suppressing the vibration (Sm+Ss) of the motor rotational speed.

Details of the Configuration of the Operation Determination Unit

Next, the configuration of the operation determination unit 301 illustrated in FIG. 3 will be described based on FIG. 5. The operation determination unit 301 executes the process of Steps S01-S03 in the flowchart of FIG. 4, and comprises a CVT oil temperature condition determining section 310, an operation request during rotation synchronization control determination section 320, and a transmission ratio/acceleration request determination section 330.

The CVT oil temperature condition determining section 310 inputs the CVT oil temperature and outputs an operation flag to the switching unit 32c (refer to FIG. 3), if the CVT oil temperature is equal to, or greater than, a predetermined value, and an ON signal indicating an operation request is input from the operation request during rotation synchronization control determination section 320.

The operation request during rotation synchronization control determination section 320 outputs an ON signal indicating an operation request to the CVT oil temperature condition determining section 310, when one of the input of a rotation synchronization control in-progress flag and an input of the transmission ratio/acceleration request determination section 330 indicates an operation flag. The rotation synchronization control in-progress flag is a flag set when shifting by one of the "D-step shifting mode" and the "manual shifting mode", with a relatively large transmission ratio change in the above-described "pseudo stepped transmission mode."

The transmission ratio/acceleration request determination section 330 outputs an ON signal indicating an operation request when executing a shift with a relatively large transmission ratio change, whereby the transmission ratio/acceleration is equal to, or greater than, a threshold value, described later. That is, shifting with a large transmission ratio change is detected during shifting by other than the "D-step shifting mode" and the "manual shifting mode" in the transmission ratio/acceleration request determination section 330.

Figure 6:
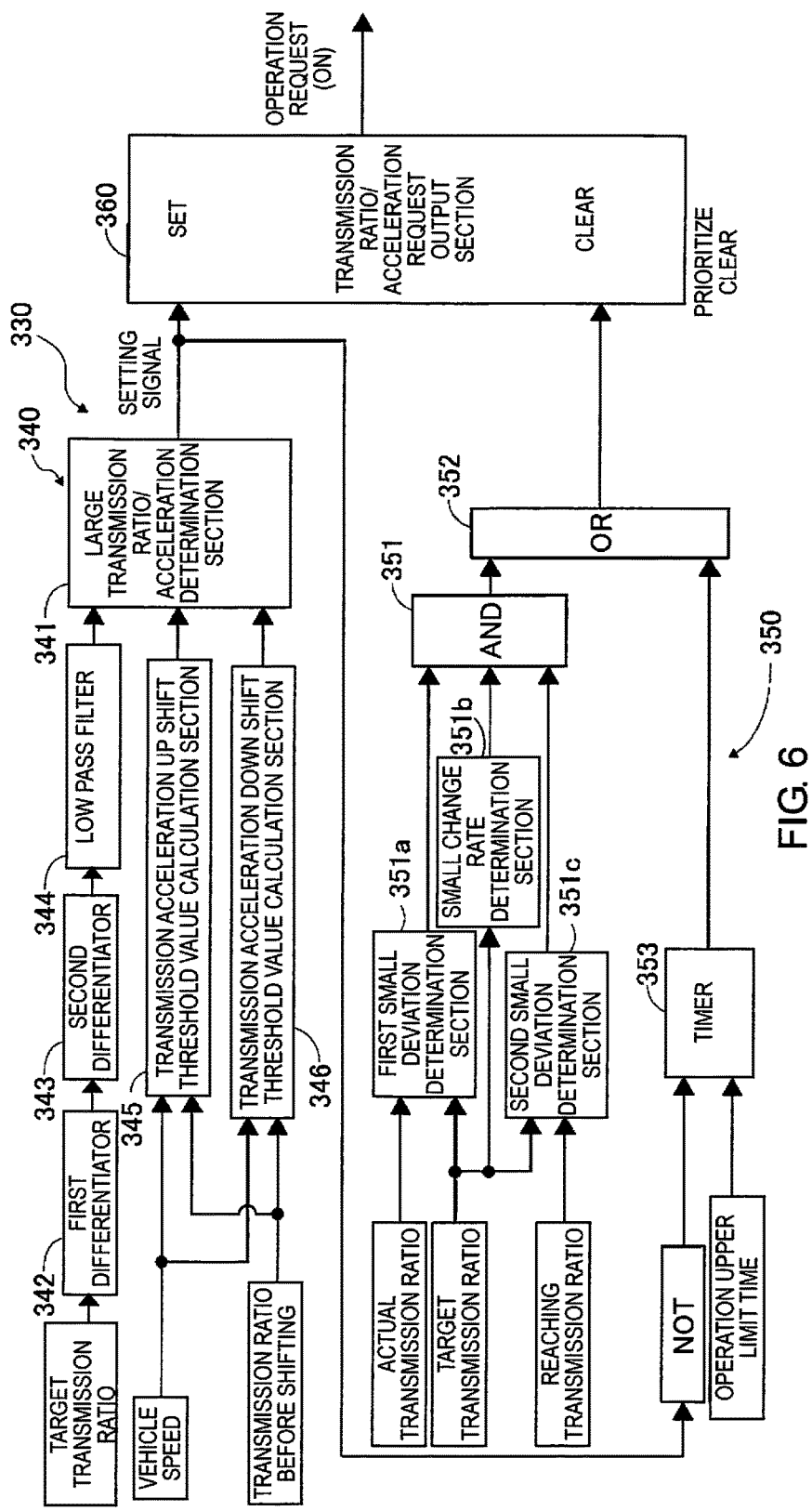
FIG. 6 is a block diagram illustrating the configuration of a transmission ratio/acceleration request determination section in the damping control device for an electric vehicle according to the first embodiment.

The configuration of the transmission ratio/acceleration request determination section 330 will be described below, based on FIG. 6. The transmission ratio acceleration request determination section 330 comprises an operation request setting section 340, an operation request clearing section 350, and a transmission ratio/acceleration request output section 360. The operation request setting section 340 outputs a setting signal that indicates an operation request when detecting a shift with a large transmission ratio change in which the transmission ratio/acceleration is a predetermined value or more. This operation request setting section 340 comprises a large transmission ratio/acceleration determination section 341, a first differentiator 342, a second differentiator 343, a low pass filter 344, a transmission acceleration UP shift threshold value calculation section 345, and a transmission acceleration DWN shift threshold value calculation section threshold value calculation section 346, as illustrated in FIG. 6.

The large transmission ratio/acceleration determination section 341 outputs a setting signal when it is determined to be a shifting with a large transmission ratio/acceleration, which is a condition for executing a subtraction operation to subtract the rotational speed change component (Ss) due to shifting. That is, a YES determination is made in Step S03 in the flowchart of FIG. 4.

Specifically, the large transmission ratio/acceleration determination section 341 inputs a target transmission ratio/acceleration, obtained by subjecting the target transmission ratio (command value) that is input from the transmission controller 11 to second-order differentiation in the first differentiator 342 and the second differentiator 343, and removing the noise therefrom by a filter process of the low pass filter 344. Furthermore, the large transmission ratio/acceleration determination section 341 inputs a transmission acceleration UP shift threshold value from the transmission acceleration UP shift threshold value calculation section 345, and inputs a transmission acceleration DWN shift threshold value from the transmission acceleration DWN shift threshold value calculation section 346. Then, the large transmission ratio/acceleration determination section 341 outputs a setting signal if the transmission ratio/acceleration indicates a rapid acceleration that is greater than the transmission acceleration UP shift threshold value during an upshift, or indicates a rapid acceleration that is greater than the transmission acceleration DWN shift threshold value during a downshift.

The transmission acceleration UP shift threshold value calculation section 345 sets a threshold value for determining whether or not the shifting has a large transmission ratio/acceleration during an upshift (when the transmission ratio is reduced). The transmission acceleration DWN shift threshold value calculation section 346 sets a threshold value for determining whether or not the shifting has a large transmission ratio/acceleration during a downshift (when the transmission ratio is increased). Then, the transmission acceleration UP shift threshold value calculation section 345 and the transmission acceleration DWN shift threshold value calculation section 346 respectively input the vehicle speed VSP and the transmission ratio before shifting, and set the absolute value of each threshold value to a smaller value, as the vehicle speed VSP is increased, and the transmission ratio is increased (low shift stage side). As a result, the determination responsiveness (sensitivity) of shifting with a large transmission ratio/acceleration is increased as the vehicle speed VSP is increased, and as the transmission ratio before shifting is increased (low shift stage side).

Figure 5:
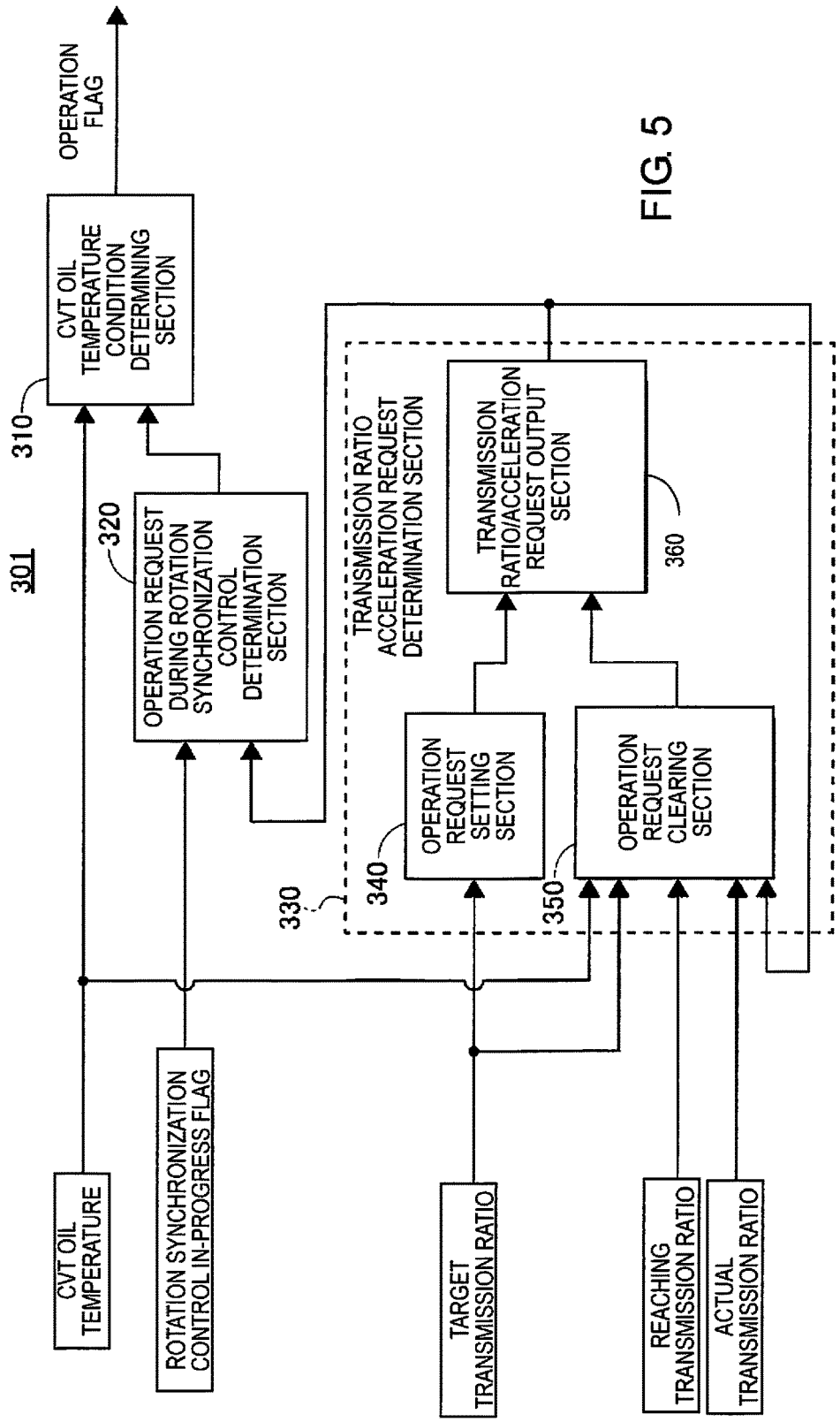
FIG. 5 is a block diagram illustrating the configuration of an operation determination unit in the damping control device for an electric vehicle according to the first embodiment.

When a setting signal is input from the large transmission ratio/acceleration determination section 341, the transmission ratio/acceleration request output section 360 outputs an ON signal indicating an operation request toward the operation request during rotation synchronization control determination section 320 (refer to FIG. 5). On the other hand, when a clearing signal is input from the operation request clearing section 350, the transmission ratio/acceleration request output section 360 stops (OFF) the output of the ON signal indicating an operation request.

The operation request clearing section 350 determines the condition for stopping the output of the operation request of the transmission ratio/acceleration request determination section 330, and comprises an AND circuit 351, an OR circuit 352, and a timer 353.

The AND circuit 351 determines a clearing condition for the operation request based on the transmission ratio/acceleration, which is based on the transmission ratio change, and outputs an ON signal indicating clear to the OR circuit 352 when the clearing condition is satisfied. The timer 353 determines a clearing condition for the operation request based on the transmission ratio/acceleration, which is based on the elapsed time, and outputs an ON signal indicating clear to the OR circuit 352 when the clearing condition is satisfied. The OR circuit 352 outputs a clearing signal to the transmission ratio/acceleration request output section 360, when an ON signal is input from either one of the AND circuit 351 and the timer 353.

Descriptions are added here regarding the clearing condition for the transmission ratio/acceleration request based on the transmission ratio change by the AND circuit 351 of the operation request clearing section 350, and the clearing condition for the operation request based on the elapsed time by the timer 353.

The clearing condition for the operation request based on the transmission ratio/acceleration of the AND circuit 351 is satisfied when it is determined that a shifting with a large transmission ratio/acceleration has ended. This shift end determination is made when the actual transmission ratio follows the target transmission ratio (command value), the change rate of the target transmission ratio (command value) falls below a predetermined value, and reaches a reaching transmission ratio, which is a transmission ratio that the target transmission ratio (command value) reaches after shifting.

Therefore, the AND circuit 351 inputs a signal from a first small deviation determination section 351a that determines the following of the actual transmission ratio to the target transmission ratio when the deviation between the actual transmission ratio and the target transmission ratio (command value) becomes less than a predetermined value. In addition, the AND circuit 351 inputs a signal from a small change rate determination section 351b that determines a decrease in the change rate of the target transmission ratio of less than a predetermined value. Furthermore, the AND circuit 351 inputs a signal from a second small deviation determination section 351c that determines that the deviation between the target transmission ratio and the reaching transmission ratio has become less than a predetermined value. Then, when determination signals that satisfy the conditions are input from all of the first small deviation determination section 351a, the small change rate determination section 351b, and the second small deviation determination section 351c, the AND circuit 351 outputs an ON signal indicating the establishment of the clearing condition to the OR circuit 352.

In addition, when the elapsed time from the time the large transmission ratio/acceleration determination section 341 outputs a setting signal exceeds a preset operation upper limit time, the timer 353 outputs a signal indicating that the operation upper limit time has been exceeded to the OR circuit 352, an ON signal that indicates the clearing condition. The operation upper limit time is set to a time with which it is possible to end shifting to carry out a transmission ratio change that is the same as the rotation synchronization control. In addition, the operation upper limit time essentially defines the upper limit of time from start of the subtraction operation of the subtraction unit 32b, and the starting of the counting of the timer 353 can be the time at which the operation flag of the operation determination unit 301 is set.

Actions of the First Embodiment

Next, the action of the first embodiment will be described. First, the operation of the feedback control unit 32 in the first embodiment will be briefly described.

Normal Time

In a normal time when not shifting or when shifting with a relatively small transmission ratio change, other than when executing shifting with a relatively large transmission ratio change, the feedback compensator 32a inputs a vibration component (Sm+Ss) of the motor rotational speed ωm that is output from the plant 34, illustrated in FIG. 3. Of the vibration components, Sm indicates the vibration component of the motor MG, and Ss indicates the rotational speed change component due to shifting of the continuously variable transmission CVT.

In this case, the feedback compensator 32a outputs a compensation torque Tm (F/B) of a reverse torque, in order to damp the vibration components (Sm+Ss) toward the adder 33, to obtain the desired damping performance. Therefore, it is possible to suppress vibration by the disturbance component that acts on the vehicle, including shifting. Therefore, if vibration caused by shifting of the continuously variable transmission CVT occurs, the feedback compensator 32a outputs a compensation torque Tm (F/B) that damps this vibration disturbance as well.

When Shifting with a Large Transmission Ratio/Acceleration

During shifting with a relatively large transmission ratio change, for which the large transmission ratio/acceleration determination section 341 outputs a setting signal, the subtraction unit 32b subtracts the rotational speed change component (Ss) from the vibration component (Sm+Ss) of the motor rotational speed corn that is output from the plant 34, illustrated in FIG. 3. The rotational speed change component (Ss) is a rotational speed change that is calculated by the shifting-induced rotational speed change calculation unit 35, based on the actual transmission ratio change.

Therefore, the feedback compensator 32a subtracts the compensation torque component for suppressing the rotational speed change component (Ss) from the compensation torque Tm (F/B) to be calculated. It is, thereby, possible to reduce the thrusting shock by the compensation torque component for suppressing the rotational speed change component (Ss), and to improve the shifting responsiveness.

The thrusting shock reducing performance will be described based on FIG. 7A and FIG. 7B.

Figure 7A:
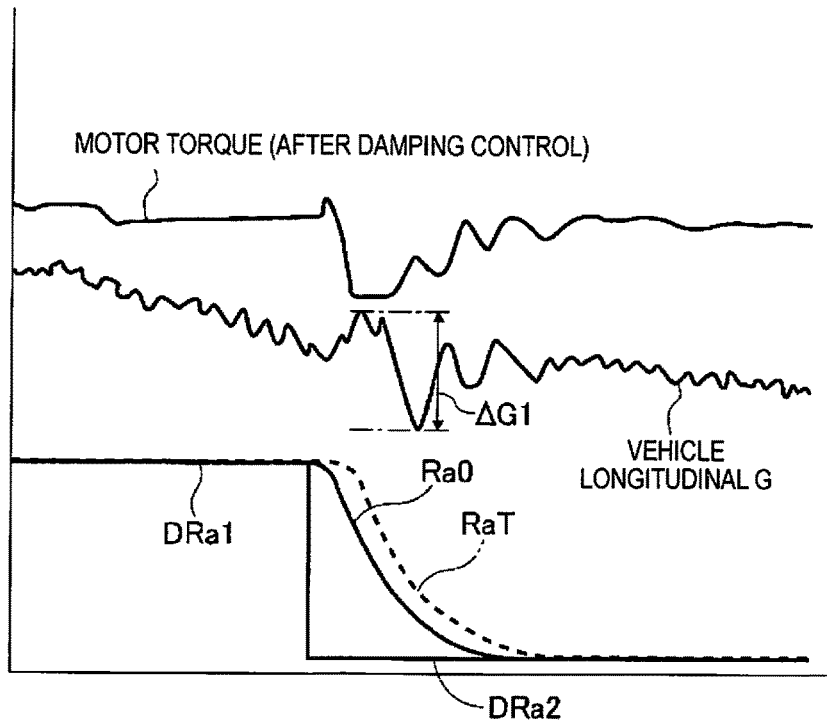
FIG. 7A is a time chart illustrating an operation example during manual upshifting of a comparative example, in which the rotational speed change component caused by a transmission ratio change is not subtracted.
Figure 7B:
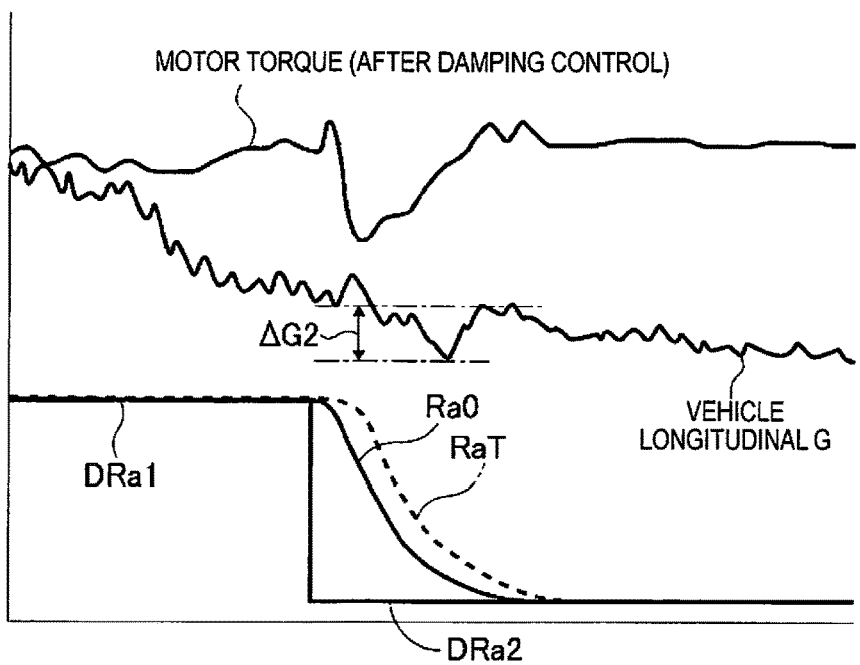
FIG. 7B is a time chart illustrating an operation example during manual upshifting in the present embodiment, in which the rotational speed change component caused by a transmission ratio change is subtracted, in the damping control device for an electric vehicle according to the first embodiment.

FIG. 7A indicates an operation example during manual upshifting of a comparative example, in which the rotational speed change component (Ss) caused by a transmission ratio change is not subtracted. In addition, FIG. 7B illustrates an operation example during manual upshifting in the present embodiment, in which the rotational speed change component (Ss) caused by a transmission ratio change is subtracted. In addition, in FIG. 7A and FIG. 7B, DRa1 indicates the target transmission ratio before shifting, DRa2 indicates the target transmission ratio after shifting, Ra0 indicates the shift command value, and DRa2 indicates the target transmission ratio at the end of the shifting.

In the operation example illustrated in FIG. 7A, the compensation torque Tm (F/B) calculated by the feedback compensator 32a includes compensation torque for suppressing reduction in the output rotational speed due to shifting. Accordingly, the motor torque (after damping control) includes a reverse torque component (rotational speed increasing component) corresponding to the compensation torque for damping the rotational speed change component (Ss), due to the transmission ratio change.

Therefore, the reverse torque component of the output rotational speed increase component in this compensation torque Tm (F/B) becomes the thrusting shock, and a longitudinal acceleration variation ΔG1 of the vehicle occurs, which also takes time to be restored to the normal state. Since this thrusting shock is increased in magnitude when the shifting responsiveness is increased and the rotational speed change is increased, it is necessary to also limit the shifting responsiveness, and it becomes difficult to execute quick shifting.

In contrast, in the first embodiment, the feedback compensator 32a calculates the compensation torque Tm (F/B) after subtracting the rotational speed change component (Ss) due to shifting. Therefore, the motor torque illustrated in FIG. 7B does not include the compensation torque component for suppressing the rotational speed change component (Ss) due to a transmission ratio change.

Accordingly, thrusting shock caused by the reverse torque for suppressing the rotation change due to shifting is suppressed, and the longitudinal acceleration variation ΔG2 of the vehicle becomes a smaller value than the longitudinal acceleration variation ΔG1 in FIG. 7A. Additionally, the time required for returning the longitudinal acceleration variation ΔG2 of the vehicle to a normal state is shortened, the shifting responsiveness is improved, and it becomes possible to execute quick shifting.

On the other hand, if subtraction of the rotational speed change component (Ss) due to a transmission ratio change is always carried out, if vibration is generated in the continuously variable transmission CVT, this vibration cannot be suppressed. Therefore, in the first embodiment, subtraction of the rotational speed change component (Ss) due to a transmission ratio change by the subtraction unit 32b described above is executed only at the time of an abrupt transmission ratio change, in which the transmission ratio/acceleration is equal to or greater than a threshold value, in which thrusting shock is significant. As a result, while damping of the rotational speed change component (Ss) by the continuously variable transmission CVT is carried out during normal time, it is possible to suppress the generation of thrusting shock by the compensation torque Tm (F/B) for suppressing the rotational speed change component (Ss) at the time of an abrupt transmission ratio change.

Detection of an Abrupt Transmission Ratio Change

Next, the detection performance of a shift (abrupt transmission ratio change) with a transmission ratio/acceleration that exceeds the threshold value (transmission acceleration UP shift threshold value, transmission acceleration DWN shift threshold value) of the first embodiment will be described. In the first embodiment, in addition to determining (S02) a shift with a large transmission ratio change by an input of a rotation synchronization control in-progress flag from the transmission controller 11, the presence or absence of a shift with a large transmission ratio change is determined based on the target transmission ratio (command value) (S03).

Such a shift with a large transmission ratio change (abrupt transmission ratio change) occurs, for example, when the driver's foot is abruptly moved away from the accelerator pedal while rapidly accelerating with the accelerator pedal (not shown) greatly depressed.

Figure 8A:
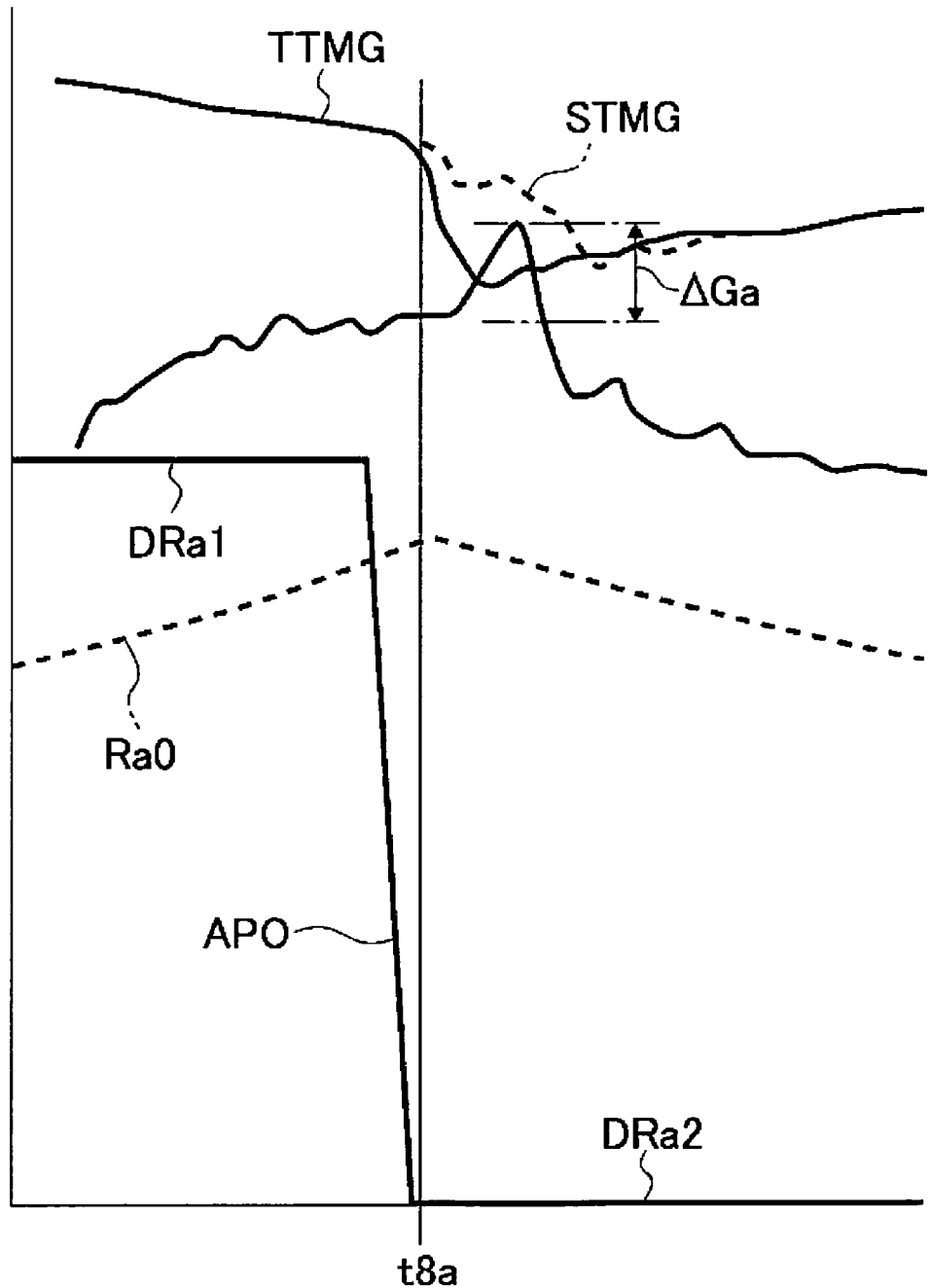
FIG. 8A is a time chart illustrating an operation of a comparative example in which a subtraction operation by a subtraction unit is not carried out when shifting with a large transmission ratio/acceleration.
Figure 8B:
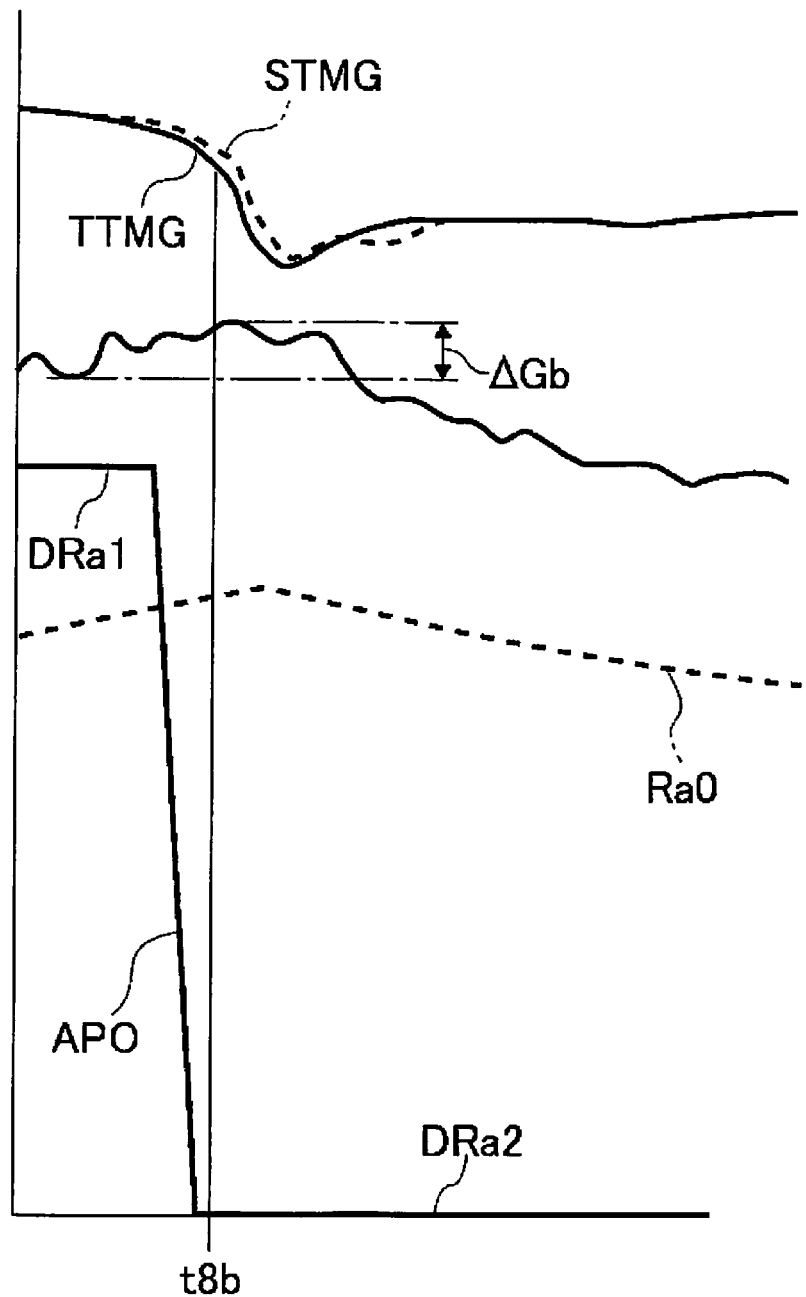
FIG. 8B is a time chart illustrating an operation example where the subtraction operation by the subtraction unit is carried out when shifting with a large transmission ratio/acceleration in the damping control device for an electric vehicle according to the first embodiment.

The operation in such a case will be described by comparing the operation of the comparative example in FIG. 8A, in which a subtraction operation by the subtraction unit 32b is not carried out, and an operation example of the first embodiment in FIG. 8B, in which the subtraction operation by the subtraction unit 32b is carried out. As illustrated in FIGS. 8A and 8B, after maintaining a state in which the accelerator position opening amount APO is large, the target motor torque (motor torque command value TTMG) is rapidly decreased (time t8a, t8b) in response to the accelerator position opening amount APO being rapidly decreased to 0.

Figure 9A:
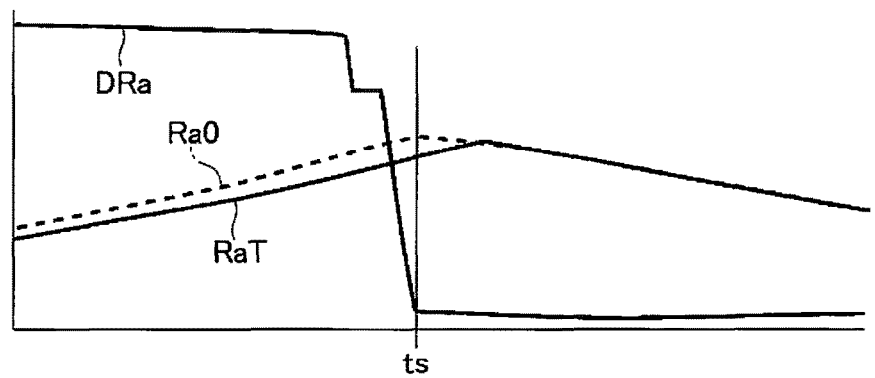
FIG. 9A is a time chart illustrating changes in the target transmission ratio (before shifting, after shifting), the target transmission ratio (command value), and the actual transmission ratio, during the operation of FIG. 8A and FIG. 8B.

In response, the target transmission ratio (command value) Ra0 changes to show an upwardly convex peak, and the transmission ratio is abruptly changed. The changes in the target transmission ratio (before shifting, after shifting) DRa, the target transmission ratio (command value) Ra0, and the actual transmission ratio RaT are illustrated in FIG. 9A. In this manner, even when traveling as described above, the target transmission ratio (before shifting, after shifting) DRa, the target transmission ratio (command value) Ra0, and the actual transmission ratio RaT show the same changes as during rotation synchronization control.

Consequently, when a correction operation by the subtraction unit 32b is not carried out, as described above, the compensation torque Tm (F/B) includes torque for damping the rotational speed change component Ss; therefore, thrusting shock occurs, and the responsiveness deteriorates. That is, the motor torque command value TTMG and an inferred actual motor torque STMG deviate as illustrated in the drawing, and a vehicle longitudinal acceleration change ΔGa is generated, as illustrated in FIG. 8A. In contrast, in the example illustrated in FIG. 8B, the deviation between the motor torque command value TTMG and the inferred actual motor torque STMG is suppressed, and the vehicle longitudinal acceleration change ΔGb is suppressed more than the vehicle longitudinal acceleration change ΔGa in FIG. 8A.

Therefore, it is necessary to precisely detect such an abrupt transmission ratio change, and to carry out subtraction by the subtraction unit 32b as described above, in order to suppress a change in the longitudinal acceleration G.

Accordingly, in the first embodiment, second-order differentiation is carried out by the first differentiator 342 and the second differentiator 343 in the operation request setting section 340, to detect a shift with a large transmission ratio/acceleration.

Figure 9B:
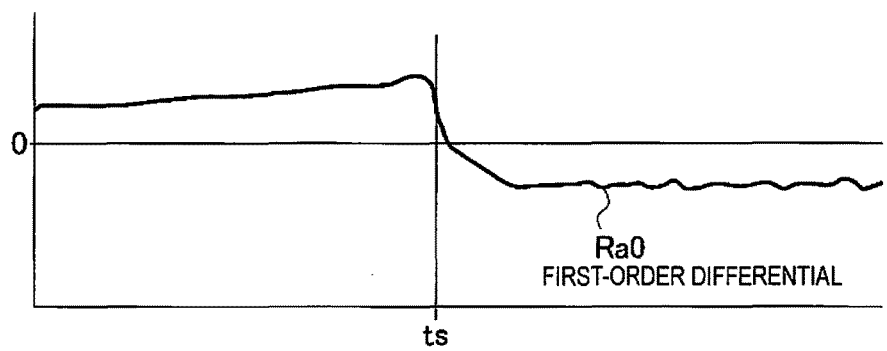
FIG. 9B is a time chart illustrating changes in the first-order differential value of the target transmission ratio (command value) illustrated in FIG. 9A.
Figure 9C:
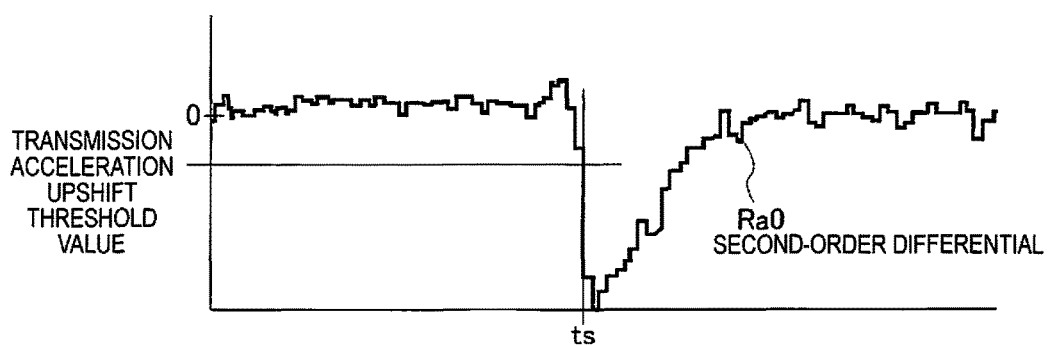
FIG. 9C is a time chart illustrating changes in the second-order differential value of the target transmission ratio (command value) illustrated in FIG. 9A.

FIG. 9B illustrates a first-order differential value of the target transmission ratio (command value) Ra0 shown in FIG. 9A, and FIG. 9C illustrates a second-order differential value of the target transmission ratio (command value) Ra0 shown in FIG. 9A. The First-order differential value shown in FIG. 9B gradually changes before and after shifting, and becomes a change that is astride "0"; therefore, comparison with the threshold value is difficult, and it is difficult to precisely detect the shifting time ts. Therefore, it is difficult to carry out the subtraction of the rotational speed change component (Ss) caused by shifting by the subtraction unit 32b at an accurate timing.

In contrast, the second-order differential value of the target transmission ratio (command value) Ra0 shown in FIG. 9C changes with a rapid incline at the time of a transmission ratio change around the apex of the chevron shape of the target transmission ratio (command value) Ra0, as illustrated, and the amount of change is also large. Therefore, detection of the shifting time ts when compared with a predetermined threshold value (transmission acceleration UP shift threshold value, transmission acceleration DWN shift threshold value) becomes easy and highly accurate.

Therefore, a subtraction operation by the subtraction unit 32b is carried out, based on the determination that the transmission ratio change is large (early) based on a second-order differential, and, as illustrated in FIG. 8B, the responsiveness of the inferred actual motor torque STMG with respect to the motor torque command value TTMG is improved, and changes in the longitudinal acceleration can also be suppressed.

End Determination

Figure 10:
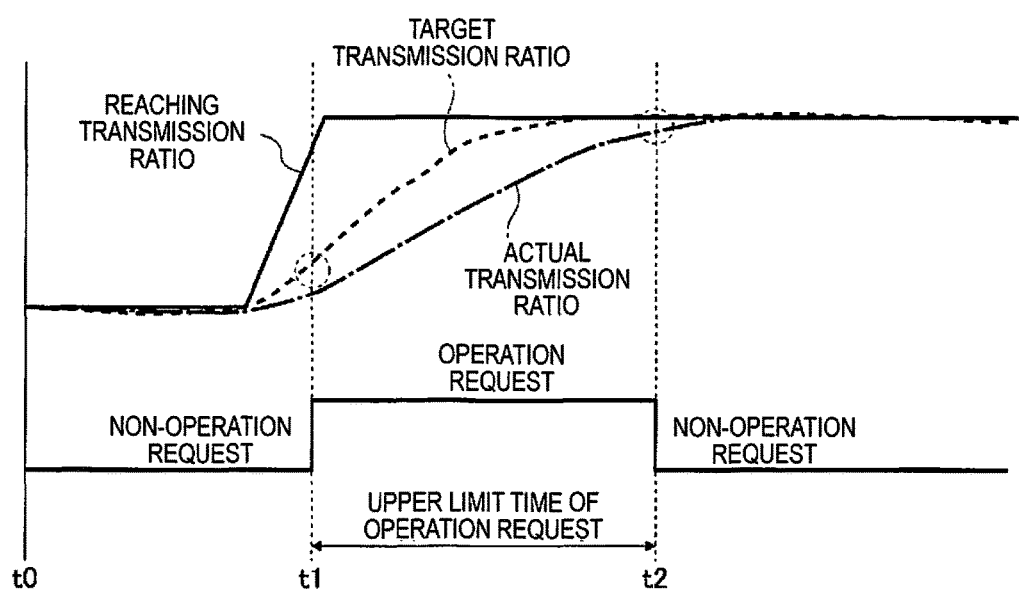
FIG. 10 is a time chart illustrating the relationship between an operation request (set) and a non-operation request (reset) in the operation determination unit.

Next, the determination when ending the subtraction operation for the rotational speed change component (Ss) by the subtraction unit 32b will be described. FIG. 10 is a time chart illustrating the relationship between an operation request (set) and a non-operation request (reset) in the operation determination unit 301, illustrating the operation examples of an operation request output by the operation request setting section 340, and an operation request clearing (non-operation request) of the operation request clearing section 350.

As described above, the setting of an operation request is carried out at time t1, when the transmission ratio/acceleration exceeds one of the two threshold values, in the large transmission ratio/acceleration determination section 341.

The subtraction unit 32b thereby starts the subtraction operation, and a determination of the end of this subtraction operation of the subtraction unit 32b is carried out based on a clearing determination by the operation request clearing section 350 of FIG. 5.

One of the clearing determinations is carried out by the transmission ratio change returning to normal. That is, as illustrated by time t2 in FIG. 10, when the actual transmission ratio follows the target transmission ratio and the deviation between the two is reduced, and the target transmission ratio reaches the reaching transmission ratio and the deviation between the two is reduced, and the change rate of the target transmission ratio is reduced, it is determined that the subtraction operation has ended. These determinations are made from the fact that the deviation calculated by the first small deviation determination section 351a illustrated in FIG. 6, the deviation calculated by the small change rate determination section 351b, and the deviation calculated by the second small deviation determination section 351c, have become less than the respective predetermined values.

The other clearing determination is when the elapsed time from the point in time at which the transmission ratio/acceleration exceeded the threshold value exceeds the upper limit time of the operation request. The upper limit time is set to a time with which shifting with an abrupt transmission ratio change can be reliably ended; when the elapsed time exceeds this time, the subtraction operation of the subtraction unit 32b is ended.

In this manner, in the first embodiment, the clearing condition for the subtraction operation of the subtraction unit 32b is configured to be meeting all of: the target transmission ratio following the actual transmission ratio, the target transmission ratio reaching the reaching transmission ratio, and reduction of the change rate of the target transmission ratio. Accordingly, the subtraction correction operation is reliably carried out during shifting; therefore, the thrusting described above can be suppressed. In addition, it is possible to carry out a subtraction correction operation in beyond this abrupt shifting, and to suppress the problem of damping the vibration component of the continuously variable transmission CVT.

In addition, by setting an upper limit time of the operation request, if the first clearing determination condition described above is not met, it is possible to continue the control to suppress the problem of damping the vibration component of the continuously variable transmission CVT.

Effects of the First Embodiment

The effects of the damping control device for an electric vehicle according to the first embodiment are listed below.

1) The damping control device for an electric vehicle according to the first embodiment has a continuously variable transmission CVT provided between a motor MG, and left and right front wheels FL and FR as drive wheels; and a feedback control unit 32 as a shift vibration suppression means that subtracts a compensation torque amount for suppressing vibration caused by shifting from a compensation torque Tm (F/B) for suppressing vibration caused by disturbance of a rotational speed of the motor MG, to control an output torque of the motor MG, comprising: a first differentiator 342 and a second differentiator 343 as transmission ratio second-order differentiation calculating means that calculates the second-order differential of the transmission ratio of the continuously variable transmission CVT, wherein when the absolute value of the second-order differential of the transmission ratio is equal to, or greater than, a transmission acceleration UP shift threshold value and a transmission acceleration DWN shift threshold value, as predetermined values, the feedback control unit 32 controls an output torque of the motor MG which subtracts a compensation torque component for suppressing vibration caused by shifting from the compensation torque Tm (F/B). By comparing the absolute value of the second-order differential of the transmission ratio with each threshold value, it becomes possible to accurately detect shifting and to prevent an erroneous detection of shifting.

Therefore, it becomes possible to carry out an operation to subtract the compensation torque component for suppressing vibration caused by shifting from the compensation torque by the feedback control unit 32 at an accurate timing. In addition, it becomes possible to suppress thrusting shock caused by reverse torque, in which the compensation torque component for suppressing vibration caused by shifting with a large transmission ratio change is included in the compensation torque, and to thereby shorten the shifting time. In addition, in the first embodiment, since the transmission ratio/acceleration is calculated from the target transmission ratio (command value) Ra0, compared to being calculated from the actual transmission ratio RaT, there is excellent responsiveness in the determination of presence or absence of a transmission ratio change, and a noise component is not included; therefore, a high determination accuracy of the presence or absence of a transmission ratio change can be obtained. On the other hand, since vibration caused by shifting to be subtracted by the subtraction unit 32b is calculated in the shifting-induced rotational speed change calculation unit 35 based on the actual transmission ratio RaT, the rotational speed change component (Ss) due to shifting can be accurately subtracted from the vibration component (Sm+Ss) of the motor rotational speed.

2) The damping control device for an electric vehicle according to the first embodiment comprises: an operation determination unit 301 as a shift determination means that determines the presence or absence of a change in the transmission ratio based on a second-order differential, wherein when the operation determination unit 301 determines that there is a change in the transmission ratio, the feedback control unit 32 controls an output torque of the motor MG which subtracts a compensation torque component for suppressing vibration caused by shifting from the compensation torque Tm (F/B). By determining the presence or absence of a change in the transmission ratio based on a second-order differential of the target transmission ratio (command value), it is possible to accurately determine the presence or absence of a change in the transmission ratio, to control the output torque of the motor MG at an accurate timing.

3) The damping control device for an electric vehicle according to the first embodiment further comprises: an operation request during rotation synchronization control determination section 320 as a manual shifting mode determination means that determines whether or not it is a manual shifting mode in which the transmission ratio is changed in a stepwise manner based on the shift request of the driver, wherein when shifting by the manual shifting mode, the feedback control unit 32 controls an output torque of the motor MG which subtracts a compensation torque component for suppressing vibration caused by shifting from the compensation torque Tm (F/B), regardless of the value of the second-order differential. Since the transmission ratio is varied in a stepwise manner in the manual shifting mode, the transmission ratio change is relatively large. Therefore, when shifting by the manual shifting mode, by carrying out a control to subtract the compensation torque component for suppressing vibration caused by shifting from the compensation torque regardless of the value of the second-order differential, it is possible to reduce thrusting shock caused by the reverse torque.

4) The damping control device for an electric vehicle according to the first embodiment further comprises a CVT oil temperature sensor 27 as a working fluid temperature detection means that detects the oil temperature of the continuously variable transmission CVT, wherein when the CVT oil temperature is equal to, or greater than, a predetermined temperature, the feedback control unit 32 controls an output torque of the motor MG which subtracts a compensation torque component for suppressing vibration caused by shifting from the compensation torque Tm (F/B). When the oil temperature of the continuously variable transmission CVT is reduced, the continuously variable transmission CVT does not operate normally; therefore, the transmission ratio command value and the actual transmission ratio deviate, and there are cases in which the feedback control unit 32 does not appropriately operate. However, here, a control to subtract the compensation torque component for suppressing vibration caused by shifting is not carried out unless the CVT oil temperature is equal to or greater than a predetermined temperature; therefore, the drive force control of the vehicle is prevented from becoming unstable.

5) The damping control device for an electric vehicle according to the first embodiment is provided with a transmission acceleration UP shift threshold value calculation section 345 and a transmission acceleration DWN shift threshold value calculation section 346, which set the transmission acceleration UP shift threshold value and the transmission acceleration DWN shift threshold value as predetermined values smaller, as the vehicle speed VSP is increased. In general, vibration caused by shifting becomes larger as the vehicle speed VSP is increased. Here, since the predetermined value for determining the presence or absence of change in the transmission ratio is reduced, as the vehicle speed VSP is increased, it is possible to enhance the determination responsiveness (sensitivity) with respect to the presence or absence of a transmission ratio change. It is thereby possible to also increase the suppression responsiveness with respect to thrusting shock caused by the reverse torque as described in 1) above.

6) The damping control device for an electric vehicle according to the first embodiment is provided with a transmission acceleration UP shift threshold value calculation section 345 and a transmission acceleration DWN shift threshold value calculation section 346, which set the transmission acceleration UP shift threshold value and the transmission acceleration DWN shift threshold value, as predetermined values, to be smaller, as the gear shift stage is reduced. In general, vibration accompanying shifting is increased as the gear shift stage is decreased (transmission ratio is larger). Here, since the predetermined value for determining a low gear shift stage (large transmission ratio), and the presence or absence of change in the transmission ratio is set to be small, it is possible to enhance the determination responsiveness (sensitivity) with respect to the presence or absence of a transmission ratio change. It is thereby possible to also increase the suppression responsiveness with respect to thrusting shock caused by the reverse torque as described in 1) above.

7) In the damping control device for an electric vehicle according to the first embodiment, the feedback control unit 32 stops the control of the output torque after an operation upper limit time has elapsed as a predetermined time from the start of a control of the output torque of the motor MG, which subtracts the compensation torque component for suppressing vibration caused by shifting from the compensation torque Tm (F/B). Therefore, it is possible to continue the operation to subtract the compensation torque component for suppressing vibration caused by shifting even after the shifting has ended, to prevent a reduction in the vibration suppression performance, with respect to the vibration component of the continuously variable transmission CVT.

8) The damping control device for an electric vehicle according to the first embodiment is provided with a transmission controller 11 that sets the target transmission ratio of the continuously variable transmission CVT, and when the deviation between an actual transmission ratio detected by a CVT transmission ratio calculation unit 37 as a transmission ratio detection means and the target transmission ratio is less than a predetermined value, the feedback control unit 32 stops the control to subtract the compensation torque component for suppressing vibration caused by shifting. Therefore, it is possible to continue the operation to subtract the compensation torque component for suppressing vibration caused by shifting even after the shifting has ended, to prevent a reduction in the vibration suppression performance, with respect to the vibration component of the continuously variable transmission CVT.

9) In the damping control device for an electric vehicle according to the first embodiment, when a change rate of the target transmission ratio is less than a predetermined value, the feedback control unit 32 stops the control of the output torque of the motor MG which subtracts a compensation torque component for suppressing vibration caused by shifting from the compensation torque Tm (F/B). Therefore, it is possible to continue the operation to subtract the compensation torque component for suppressing vibration caused by shifting even after the shifting has ended, to prevent a reduction in the vibration suppression performance, with respect to the vibration component of the continuously variable transmission CVT.

10) In the damping control device for an electric vehicle according to the first embodiment, when the deviation between the target transmission ratio and the reaching transmission ratio is less than a predetermined value, the feedback control unit 32 stops the control of the output torque of the motor MG which subtracts a compensation torque component for suppressing vibration caused by shifting from the compensation torque Tm (F/B). Therefore, it is possible to continue the operation to subtract the compensation torque component for suppressing vibration caused by shifting even after the shifting has ended, to prevent a reduction in the vibration suppression performance.

The damping control device for an electric vehicle of the present invention was described above based on the embodiment, but specific configurations thereof are not limited to this embodiment, and various modifications and additions to the design can be made without departing from the scope of the invention according to each claim.

For example, in the embodiment, a motor-generator that is capable of powering and regeneration was shown as the motor, but no limitation is imposed thereby, and a motor that is only capable of powering may be used as well. In addition, in the embodiment, a hybrid vehicle comprising an engine and a motor as drive sources was shown as an electric vehicle, but the invention can be applied to an electric vehicle having only a motor as a drive source. In addition, in the embodiment, examples were shown in which a continuously variable transmission is used as the transmission; however, the transmission is not limited to a continuously variable transmission, and other manual or automatic transmission may be used as well. Additionally, in the embodiment, the clearing condition 0 for the subtraction operation request based on the transmission ratio/acceleration was set to be all of: deviation between the actual transmission ratio and the target transmission ratio (command value) being small, the change rate of the target transmission ratio (command value) is less than a predetermined value, and the deviation between the target transmission ratio (command value) and the reaching transmission ratio is small, but no limitation is imposed thereby. That is, any one, or any two of these conditions may be used as the clearing condition. In addition, in the embodiment, a predetermined damping control is executed when it is determined that the second-order differential of the transmission ratio has exceeded a threshold value, but no limitation is imposed thereby; a determination operation on whether or not the second-order differential of the transmission ratio has exceeded a threshold value is not necessarily required, as long as a compensation torque corresponding to the shifting is subtracted is limited only to when the second-order differential of the transmission ratio exceeds a threshold value. In addition, in the embodiment, determination is made using the target transmission ratio Ra0 in the transmission ratio acceleration request determination section 330; however, the absolute value of the target transmission ratio Ra0 may be calculated, and a determination may be made based on the absolute value and the threshold value. In addition, in the embodiment, determination is made using the target transmission ratio Ra0 in the transmission ratio acceleration request determination section 330; however, this is to make a more accurate determination than using the actual transmission ratio RaT. That is, if the actual transmission ratio RaT is used, a determination based on a value including disturbance is required; therefore, the target transmission ratio Ra0 is used in the transmission ratio acceleration request determination section 330. However, while the target transmission ratio Ra0 is used for the determination in the present embodiment, no limitation is imposed thereby, and it is possible to make a determination using the actual transmission ratio RaT as well.

The invention claimed is:

1. A damping control device for an electric vehicle having a transmission provided between a motor and drive wheels, the damping control device comprising:
    a shift vibration suppression unit that subtracts a compensation torque component for suppressing vibration caused by shifting from a compensation torque for suppressing vibration caused by disturbance of a rotational speed of a motor to control an output torque of the motor; and
    the damping control device comprising:
    a transmission ratio second-order differentiation calculating unit that calculates a second-order differential of a transmission ratio of the transmission,
    the shift vibration suppression unit carries out the control of the output torque of the motor, when an absolute value of the second-order differential is equal to or greater than a predetermined value.

2. The damping control device according to claim 1, comprising:
    a shift determination unit that determines a presence or absence of a change in the transmission ratio based on the second-order differential,
    the shift vibration suppression unit carries out the control of the output torque of the motor, when the shift determination means determines that there is a change in the transmission ratio.

3. The damping control device according to claim 2, further comprising:
    a manual shifting mode determination unit that determines whether or not it is a manual shifting mode in which the transmission ratio is changed in a stepwise manner based on a shift request of a driver,
    the shift vibration suppression unit carrying out a control of the output torque of the motor regardless of the value of the second-order differential, when shifting by the manual shifting mode.

4. The damping control device according to claim 1, further comprising:
    a working fluid temperature detection unit that detects a temperature of a working fluid of the transmission, wherein
    the shift vibration suppression unit carrying out a control of the output torque of the motor, when the working fluid temperature is a predetermined temperature or higher.

5. The damping control device according to claim 1, further comprising:
    a predetermined value setting unit for setting the predetermined value smaller as the vehicle speed is increased.

6. The damping control device according to claim 1, wherein
    a predetermined value setting unit for setting the predetermined value smaller as a gear shift stage is lower with respect to the gear shift stage before shifting.

7. The damping control device according to claim 1, wherein
    the shift vibration suppression unit stops the control of the output torque of the motor after a predetermined time has elapsed from a start of the control of the output torque of the motor.

8. The damping control device according to claim 1, wherein
    a shift control unit that sets a target transmission ratio of the transmission is provided; and
    the shift vibration suppression unit stopping the control of the output torque of the motor when a deviation between a transmission ratio that is detected by the transmission ratio detection unit and the target transmission ratio is less than a predetermined value.

9. The damping control device according to claim 8, wherein
    the shift vibration suppression unit stops the control of the output torque of the motor when a change rate of the target transmission ratio is less than a predetermined value.

10. The damping control device according to claim 8, wherein
    the shift vibration suppression unit stops the control of the output torque of the motor when a deviation between the target transmission ratio and a reaching transmission ratio by a shift control of the shift control unit is less than a predetermined value.

* * * * *